(12) United States Patent
Ambrosy et al.

(10) Patent No.: US 6,633,705 B2
(45) Date of Patent: Oct. 14, 2003

(54) MODAL FIELD CONVERTER FOR A HIGHLY EFFICIENT COUPLING IN OPTICAL MODULES

(75) Inventors: Anton Ambrosy, Tiefenbronn (DE); Alexis Lestra, Ruoms (FR)

(73) Assignee: Alcatel, Paris (FR)

( * ) Notice: Subject to any disclaimer, the term of this patent is extended or adjusted under 35 U.S.C. 154(b) by 127 days.

(21) Appl. No.: 09/924,717

(22) Filed: Aug. 9, 2001

(65) Prior Publication Data

US 2002/0031306 A1 Mar. 14, 2002

(30) Foreign Application Priority Data

Aug. 11, 2000 (EP) .............................................. 00440227

(51) Int. Cl.[7] ................................................. G02B 6/36
(52) U.S. Cl. .............................. 385/43; 385/42; 385/41; 385/49
(58) Field of Search ............................. 385/43, 42, 41, 385/49, 38, 89, 50

(56) References Cited

U.S. PATENT DOCUMENTS

| | | | | |
|---|---|---|---|---|
| 4,566,753 A | * | 1/1986 | Mannschke | 385/46 |
| 5,402,511 A | | 3/1995 | Malone et al. | |
| 5,594,824 A | * | 1/1997 | Kerndlmaier | 385/49 |
| 5,720,893 A | | 2/1998 | Ben-Michael et al. | |
| 5,930,423 A | | 7/1999 | Chen et al. | |
| 5,985,685 A | * | 11/1999 | Lealman et al. | 438/31 |
| 6,195,481 B1 | * | 2/2001 | Nakajima et al. | 385/24 |
| 6,434,303 B1 | * | 8/2002 | Temkin et al. | 385/43 |

FOREIGN PATENT DOCUMENTS

| | | |
|---|---|---|
| DE | 3415 576 A1 | 4/1984 |
| EP | 0 903 602 A2 | 3/1999 |
| FR | 2 760 850 | 3/1997 |

OTHER PUBLICATIONS

"Highly Reliable and low–cost plastic modules of spot size converter integrated laser diodes for access network systems", H. Oohashi et al., ECOC 97, Sep. 22–25 1997, Conference Publication 448.

* cited by examiner

*Primary Examiner*—Mohammad Sikder
(74) *Attorney, Agent, or Firm*—Sughrue Mion, PLLC

(57) ABSTRACT

An optical module (1) which contains at least one optical component (2) whose one optical input/output is directed towards an optical fiber (4) to which it is to be coupled. At least one additional optical waveguide (6) is arranged between this optical component (2) and the optical fiber (4). The optical component (2) is provided with an optical waveguide (3) whose end (5), facing towards the optical fiber (4), is tapered or widened for a modal field adaptation. Additionally the end of each interposed optical waveguide (6) facing towards the optical fiber (4) is also tapered or widened for a modal field adaptation.

9 Claims, 2 Drawing Sheets

MODAL FIELD CONVERTER FOR A HIGHLY EFFICIENT COUPLING IN OPTICAL MODULES

TECHNICAL FIELD

The invention relates to an optical module which contains an optical component with at least one optical input and/or output, wherein an optical input and/or output is directed towards an optical fiber and this input and/or output comprises an optical waveguide whose end, facing towards the optical fibber, is of tapered or widened formation for a modal field adaptation.

The invention is based on a priority application (00440227.7) which is hereby incorporated by reference.

BACKGROUND OF THE INVENTION

Optical modules for processing light signals contain different optical components, such as purely optical or opto-electric components, for example opto-electric converters (generally laser diodes or photodiodes), amplifiers or modulators. Such components are coupled with optical fibres, normally glass fibres, but optionally also plastic fibres. Among other things, the power output of such optical modules is dependent upon the quality of this coupling.

As the diameter of the modal field at the input and/or output (in the following abbreviated to input/output) of such components is distinctly smaller than that of the modal field in the core of the optical fibre, different techniques have been developed to optimise the coupling. It has long been prior art to provide the input/output of the optical component with a waveguide whose end facing towards the optical fibre is tapered, for example in the form of a frustum, or is widened. Optionally, the waveguide and the core of the optical fibre can lie on the same axis. As a result of the oblique surfaces at the taper (for example the frustum) the modal field is enlarged by the light radiating therefrom, so that ideally a diameter is achieved which is equal to that of the modal field at the input of the optical fibre. Accordingly, modal field converters ("spot-size converter" or "taper") are referred to. Such tapered/widened ends are generally structured directly in the same layer (for example in a semiconductor layer made of doped InP) in which the optical component was formed, either vertically or horizontally or even in both directions of the plane (see e.g. H. Oohashi et al. ECOC97, No. 448, p. 351–354, 1997).

It is also prior art (see e.g. DE 34 15 576) to use miniaturised lenses as modal field converters. This enables the efficiency of this coupling to be considerably increased. However the use of miniaturised lenses has the disadvantage of the extremely poor adjustment. The outlay required to achieve a satisfactory coupling with the high tolerance requirements is correspondingly high.

A combination of taper-like modal field converter and miniaturised lenses partially facilitates a good coupling. However the adjustment problems associated with the miniaturised lenses remain. Consequently the costs of optical modules designed in this way cannot be sufficiently reduced. This remains a considerable obstacle to their further development.

SUMMARY OF THE INVENTION

The object of the invention is to further develop an optical module wherein the coupling between optical components arranged thereon and optical fibres aligned therewith is extremely efficient without excessively increasing the costs of such optical modules.

The object is achieved in accordance with the invention by an optical module which contains an optical component with at least one optical input and/or output, wherein an optical input and/or output is directed towards an optical fibre and this input and/or output comprises an optical waveguide whose end, facing towards the optical fibre, is of tapered or widened formation for a modal field adaptation, wherein between the optical waveguide of the optical component and the optical fibre there is arranged an additional optical waveguide whose end, facing towards the optical fibre, is of tapered or widened formation for a modal field adaptation.

The interposition of an additional modal field converter between the input/output of the optical component and the optical fibre to be coupled therewith facilitates a high degree of efficiency for such a coupling without the occurrence of disadvantageous alignment faults, particularly at the edge of the modal field, as is the case when a miniaturised lens is used. Moreover, this additional modal field converter is generally positioned on the optical module using current techniques. For this purpose this additional modal field converter can be separately produced and then soldered or glued onto the optical module.

However, it can also be particularly advantageous to integrate this modal field converter directly in the optical module. For this purpose, the modal field converter is then structured on such optical modules, similarly for example as in the case of optical waveguides. Such optical modules are generally constructed on a silicon wafer (Si-wafer) serving as carrier. The optical waveguides are then integrated in known manner onto such silicon wafers, i.a. by a layer construction of differently doped silicate glasses ($SiO_2$, SiON, . . . ). This considerably simplifies the alignment of the different components onto such an optical module as well as their packaging, i.a. in comparison to the use of miniaturised lenses.

Advantageous developments of the invention are described in the dependent claims, the following description and the drawings.

BRIEF DESCRIPTION OF THE DRAWINGS

An exemplary embodiment of the invention will now be explained further with reference to the attached drawings in which:

FIG. 2b is a side view of the optical module according to the invention shown in FIG. 2a.

BEST MODE FOR CARRYING OUT THE INVENTION

Figure 1:
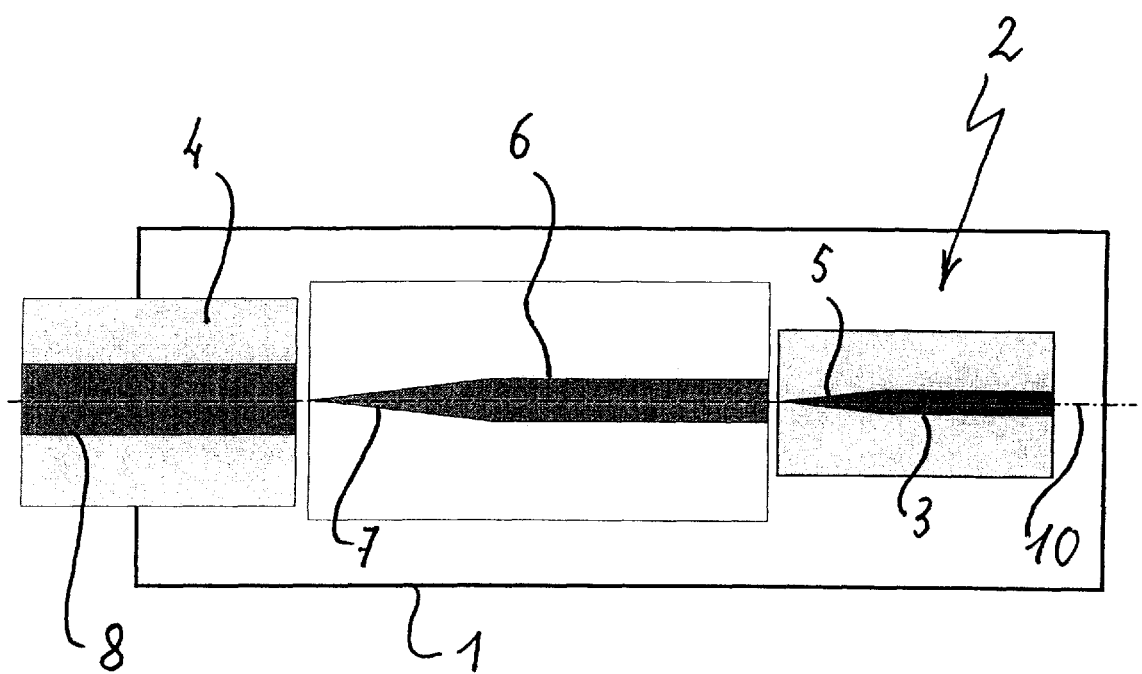
FIG. 1 is a schematic plan view of an optical module according to the invention together with an enlargement of the waveguide.

FIG. 1 is a plan view of an optical module 1 in which all the waveguides have been shown on an enlarged scale for clarity. Optionally this plan view can also only form a part (portion) of an optical module. An optical component 2 is outlined in the exemplary embodiment according to FIG. 1. This optical component 2 also comprises an optical waveguide 3 which forms the one input/output of this optical component 2. An optical fibre 4 to be coupled to the optical component 2 is directed towards the optical module 1 in alignment with this optical waveguide 3.

An additional optical waveguide 6 according to the invention is arranged between the optical fibre 4 and the optical component 2. This interposed waveguide 6 is aligned such that its optical axis is parallel to an axis 10 on which the optical axes both of the optical fibre 4 and of the optical waveguide 3 of the optical component 2 lie.

This interposed optical waveguide 6 serves as modal field converter. In actuality, the modal field which results from a core 8 of the optical fibre 4 is distinctly larger than the modal field at the input/output of the optical component 2. The interposed optical waveguide 6 is selected such that its modal field has a diameter $D_{II}$ which is larger than the diameter $D_I$ of the modal field of the optical waveguide 3 of the optical component 2 and smaller than the diameter $D_{III}$ of the modal field in the core 8 of the optical fibre 4. Advantageously, this diameter $D_{II}$, can be defined in accordance with the following formula:

$$D_{II} = \sqrt{D_I \times D_{III}}$$

To render the coupling between the optical fibre 4 and the optical component 2 highly efficient, the optical waveguide 3 of the optical component 2 is of conical formation at the end 5 facing towards the optical fibre 4. This tapered end 5 (taper), here shown as conical but in reality formed in the manner of a frustum, is centered with the axis 10. It is entirely possible to user tapers whose end faces in each case form the surface of a paraboloid or hyperboloid. The interposed optical waveguide 6 is formed in a similar conical fashion at the end 7 facing the optical fibre 4. This tapered end 7 is also centered with the axis 10. Thus in accordance with the invention, the modal field is enlarged in two steps, starting at the input/output of the optical component 2 up to the optical fibre 4.

Normally the diameter $D_I$ of the modal field at the input/output of the optical component 2 typically amounts to 2 μm. Due to the taper at the end 5 of the optical waveguide 3 of the optical component 2, the diameter of the modal field is enlarged to approximately 6 μm. A greater enlargement in one step is not compulsory. However as the diameter $D_{III}$ of optical fibres, such as glass fibres, typically amounts to approximately 10 μm, the modal field is further enlarged with the interposed optical waveguide 6. For this purpose a value of approximately 6 μm is then selected for the diameter $D_{II}$ of the interposed optical waveguide 6. The core of this waveguide 6 outside the tapered or widened zone has a diameter of 2 to 7 μm and preferably 5 μm.

The correspondingly tapered end 7 of this interposed optical waveguide 6 will further enlarge the diameter of the modal field to approximately 10 μm. The use of this interposed optical waveguide 6 as modal field converter permits a substantial reduction of losses in the transmission of light signals between the optical fibre 4 and the optical component 2 of the optical module 1. Here it is not essential to center the tapered ends 5, 7 with the axis 10. It is also possible to select asymmetrical taper forms, such as for example that of an uneven elliptical paraboloid.

This interposed optical waveguide 6 can be produced from differently doped silicate layers (e.g. $SiO_2$). Optionally it can be fixed on the optical module 1 either by gluing or soldering. Advantageously however, this interposed optical waveguide 6 can be directly structured in the optical module 1. Accordingly this can take place simultaneously to the structuring of other optical components on this optical module. This facilitates a highly efficient coupling between the optical fibre 4 and the optical component 2 without increasing the complexity of the optical module. If the interposed optical waveguide 6 is integrated in the optical module 1, the adjustment along the axis 10 is simplified accordingly.

Figure 2A:
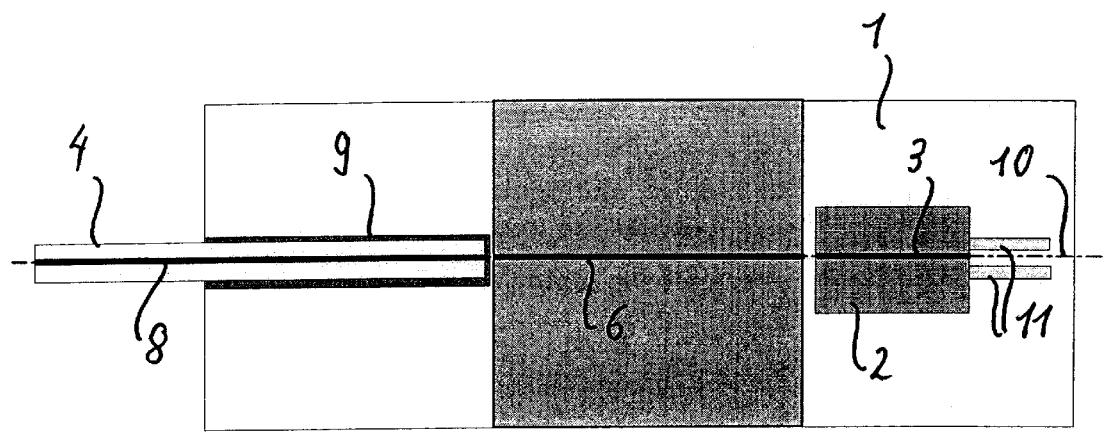
FIG. 2a is a plan view of the optical module according to the invention.
Figure 2B:
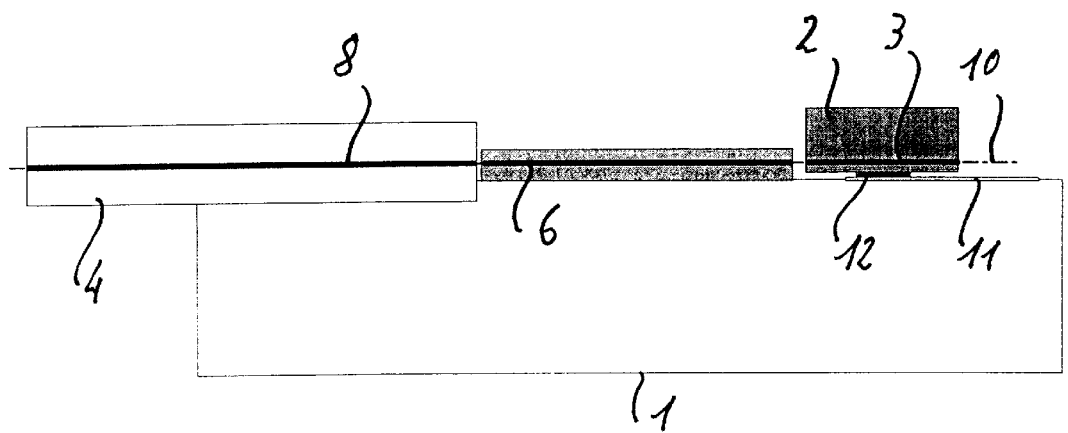

FIGS. 2a and 2b illustrate an example of such an optical module 1 wherein all the optical waveguides 3, 6, 8 are directly constructed on a common assembly platform, e.g. a Si-substrate. The optical component 2 used here is an opto-electrical component, for example a laser diode. They are preferably flip-chip bonded on the common carrier. In the lateral view in FIG. 2b the optical (opto-electric) component 2 is positioned on a bump 12 from which two leads 11 project. The leads provide for the electrical supply to the opto-electric component. The optical fibre 4, for example a glass fibre, is passively mounted in a prestructured groove 9 in front of the optical waveguides 3, 6.

This construction according to the invention can be used both for the coupling of optical fibres with purely optical components such as an amplifier or a modulator and those with an opto-electronic component, such as for example a diode laser.

If a plastic fibre is used in place of a glass fibre for the optical fibre 4, it can be expedient not merely to interpose one single modal field converter according to the invention, but to arrange a plurality of similar modal field converters of this kind in series in a cascade arrangement. This enables the diameter of the modal field to be progressively enlarged from 6 μm to considerably larger diameters. In this way it is possible to achieve the diameter size of the modal field of a plastic fibre. For this purpose the modal field diameter outside the conical zone of the respective interposed optical waveguide will then increase from the optical component to the optical fibre.

It is entirely possible to provide a corresponding construction according to the invention both at the input and at the output of an optical component of an optical module. This is only dependent upon whether a modal field adaptation is required both at the input and at the output of the optical component. If this is actually the case, the construction shown in the Figures is additionally extended in a similar manner. It is thus clear that this construction as shown in the Figures can be used both for light signals which pass from the optical fibre 4 to the optical component 2 or vice versa. The present invention not only covers the situation in which the zone of the interposed optical waveguide 6 serving as modal field converter—the end 7—is of conical formation, but also other forms of tapering or widening as are known in this context.

What is claimed is:

1. An optical module which contains an optical component with at least one optical coupling, wherein an optical coupling is directed towards an optical fibre and this coupling comprises an optical waveguide whose end, facing towards the optical fibre, includes a zone of progressively changing cross-section for a modal field adaptation, wherein between the optical waveguide of the optical component and the optical fibre there is arranged an interposed optical waveguide whose end, facing towards the optical fibre, includes a zone of progressively changing cross-section for a modal field adaptation.

2. An optical module according to claim 1, the zone of the interposed optical waveguide being frustum-shaped.

3. An optical module according to claim 1, the interposed optical waveguide consisting at least partially of silicate.

4. An optical module according to claim 1, the interposed optical waveguide being integrated in the optical module.

5. An optical module according to claim 1, the modal field in the interposed optical waveguide having a diameter $D_{II}$ outside the zone which is defined by the following formula:

$$D_{II} = \sqrt{D_I \times D_{III}},$$

where $D_I$ is the diameter of the modal field of the optical waveguide of the optical component outside the zone arid $D_{III}$ is the diameter of the modal field in the core of the optical fibre.

6. An optical module according to claim 1, the interposed optical waveguide having a core outside the zone with a diameter of 2 to 7 μm.

7. An optical module according to claim 1, the optical component having the form of a laser, amplifier or modulator.

8. An optical module according to claim 1, the interposed optical waveguide serving for the modal field adaptation of light which, according to the function of the optical component, passes between the optical fibre and the optical component.

9. An optical module according to claim 1, wherein in the case of an optical fibre made of plastics material, and wherein the modal field diameter of the core is distinctly larger than 10 μm, at least two interposed optical waveguides are arranged in series, with the modal field diameter outside the zone of the respective interposed optical waveguide increasing from the optical component to the optical fibre.

* * * * *